United States Patent [19]
Kraft et al.

[11] Patent Number: 6,137,488
[45] Date of Patent: Oct. 24, 2000

[54] SYSTEM FOR CREATING STRUCTURED FIELDS ON ELECTRONIC FORMS

[75] Inventors: Reiner Kraft, Gilroy; Qi Lu, San Jose; Ron Yair Pinter, Palo Alto, all of Calif.

[73] Assignee: International Business Machines Corporation, Armonk, N.Y.

[21] Appl. No.: 09/124,565

[22] Filed: Jul. 29, 1998

Related U.S. Application Data

[63] Continuation-in-part of application No. 09/124,635, Jul. 29, 1998.
[60] Provisional application No. 60/067,684, Dec. 5, 1997, and provisional application No. 60/067,675, Dec. 5, 1997.

[51] Int. Cl.[7] ................................................ G06F 3/00
[52] U.S. Cl. ...................... 345/333; 345/339; 345/334; 707/102; 707/4
[58] Field of Search ........................... 707/505, 506, 707/507, 508, 4, 102, 5, 104; 345/333–335, 339

[56] References Cited

U.S. PATENT DOCUMENTS

| | | | |
|---|---|---|---|
| 5,113,341 | 5/1992 | Kozol et al. | 707/531 |
| 5,185,698 | 2/1993 | Hesse et al. | 707/531 |
| 5,418,950 | 5/1995 | Li et al. | 707/4 |
| 5,444,841 | 8/1995 | Glaser et al. | 395/149 |
| 5,450,538 | 9/1995 | Glaser et al. | 395/149 |
| 5,471,613 | 11/1995 | Banning et al. | 707/4 |
| 5,544,285 | 8/1996 | Glaser et al. | 707/506 |
| 5,721,901 | 2/1998 | Banning et al. | 707/4 |
| 5,787,418 | 7/1998 | Hibbets et al. | 707/4 |
| 5,909,684 | 6/1999 | Nelson | 707/103 |
| 5,963,938 | 10/1999 | Wilson et al. | 707/4 |
| 5,963,952 | 10/1999 | Smith | 707/102 |
| 5,966,126 | 10/1999 | Szabo | 345/348 |

OTHER PUBLICATIONS

SpaceSQL (JARS Automatic Resource Listing). Lists "Date Submitted" as Nov. 1, 1996. Found online at www.jars.com.

MsqlManager (JARS Automatic Resource Listing). Lists "Date Submitted" as Feb. 20, 1997. Found online at www-.jars.com.

Madurapperuma, A. P., Gray, W. A., Fiddian, N. J. "A Visual Query Interface for a Customizable Visualization System." Database Engineering and Aplicatiions Symposium, IDEAS '97. Proceedings, International (held Aug. 25–27, 1997). IEEE. ©1997. pp. 25–27.

Spoerri, A. "InfoCrystal: a visual tool for information retrieval & management." Proceedings of the Second International Conference on Information and Knowledge Management (held Nov. 1–5, 1993). Association for Computing Machinery. ©1993. pp. 11–20.

*Primary Examiner*—Joseph H. Feild
*Assistant Examiner*—Michael J. Perkins
*Attorney, Agent, or Firm*—Dan Hubert & Assoc.

[57] ABSTRACT

A computer system enables a user to conveniently fill-out, configure, and submit a structure of interrelated data fields, where the order and type of linking between the fields is user selected. A graphical user interface presents a field template having one or more data fields. The user may extend the electronic form by selecting an expand form field; in response to selection of the expand field, the user interface adds a second field template and a connective field to the display. This second template, like the first, includes one or more data fields. Using a connective field, the user identifies a logical relationship between the first field template and the second field template. For instance, the user may select from Boolean or other connective terms to construct a form having a complex format of interrelated fields. As each new field template is added with its corresponding connective field, the user interface also presents a nesting icon, allowing the user to establish a logical hierarchy between the various field templates.

37 Claims, 6 Drawing Sheets

SYSTEM FOR CREATING STRUCTURED FIELDS ON ELECTRONIC FORMS

CROSS-REFERENCE TO RELATED APPLICATIONS

This application is a continuation-in-part of Provisional Patent Application Ser. No. 60/067,684, filed Dec. 5, 1997 in the names of Reiner Kraft et al.

This application is related to Provisional Patent Application Ser. No. 60/067,675, filed Dec. 5, 1997 in the names of Reiner Kraft et al. The present application is also related to a continuation-in-part of the 60/067,675 application having U.S. application No. 09/124,635 filed Jul. 29, 1998, entitled "System for Directly Accessing Fields on Electronic Forms," filed herewith in the names of Reiner Kraft et al.

BACKGROUND OF THE INVENTION

1. Field of the Invention

The present invention generally relates to electronic forms, also called "on-line forms" or "computerized forms." More particularly, the present invention relates to a system and method enabling a computer user to conveniently fill-out, configure, and submit a structure of interrelated data fields. The order and type of linking between the fields are user-selected.

2. Description of the Related Art

With the incorporation of computers into virtually every aspect of society, computer users are often confronted with computer-generated forms that must be completed to interact with a computer application. Such computerized forms provide a standard format including a fixed number of data fields, to be filled-out by the user. Depending upon the information to be entered, some users may find it difficult or inconvenient to conform their information to the particular blanks on the form and their relative structure.

In many cases, a user must pass through or skip over many blanks on the form that do not pertain to their entry of information, thereby wasting valuable time. This is the case, for example, where a user wishes to complete two fields of a fifty-field form. In this situation, the following patent application describes one technique that aids the user in constructing, completing, and submitting a customized group of form blanks, thereby avoiding inapplicable form blanks: U.S. application No. 09/124,635, entitled "System for Directly Accessing Fields on Electronic Forms," filed herewith in the names of Reiner Kraft et al, and assigned to International Business Machines Corp. As one example, the foregoing approach may be used to conveniently complete an on-line business expense report.

Certain other applications, however, require computer users to express a complex entry with particularly interrelated form blanks, instead of independent text strings and similar data fields. For example, internet and other database search engines often provide a form page with a predetermined number of coupled data fields, for the user to construct a query using a Boolean expression. In cases like this, some users might experience frustration because the provided page does not contain the desired number or connectivity of data fields for more sophisticated requests. Rather than simply constructing his/her envisioned query, the user is faced with the difficult task of somehow adapting the provided form to implement the query. Thus, such forms lack the power to quickly and easily express the structure and relationships of the user's data.

Consequently, due to certain unsolved problems, the known approaches to computer forms are not completely adequate for more complex form entries with interrelated form fields.

SUMMARY OF THE INVENTION

Broadly, the present invention enables a computer user to conveniently fill-out, configure, and submit a structure of interrelated data fields, where the order and type of linking between the fields are user selected. The invention is practiced on a host computer, a local computer in communication with a host, or one or more other suitable digital data processing machines. The host includes a central processing unit (CPU) with access to storage containing a sequence of computer-readable instructions executable by the CPU to create a graphical user interface (GUI) with the features of the invention. The user interface permits the user to complete data fields on electronic forms, and to establish relationships between those fields.

In one particular embodiment, the user interface presents a field template having a classification field and a data field. A form expand field and a submit field are also displayed. With the user interface, the user selects the desired classification entry from a list of available classification entries, and enters the appropriate data within the data field corresponding to the classification entry selected.

The user may extend the electronic form by selecting the expand form field; in response to selection of the expand field, the user interface adds a second field template and a connective field to the display. This second template, like the first, includes a classification field and a data field. The user selects a classification entry from the list of available classification entries, and enters the appropriate data within the data field corresponding to the classification entry in the second field template. The connective field allows the user to specify the relationship between the first field template and the second field template. For instance, the user may select Boolean connectives such as AND, OR, NOT, and the like to construct a form having a complex format of interrelated fields.

As each new field template is added with its corresponding connective field, the user interface also presents a nesting field, the activation of which establishes a hierarchy between the displayed field templates. This helps to group the field templates into complex expressions, such as expressions involving nested Boolean logic expressions.

In response to user selection of the submit field, a representation of the completed form is transmitted to a predetermined destination. This destination may comprise local storage, volatile memory, another computer, or another location. The representation of the completed form may comprise a linked list, database, ASCII text, or another suitable data structure.

The present invention includes a number of different aspects. One aspect concerns a method of providing a graphical user interface enabling a computer user to conveniently fill-out, configure and submit a structure of interrelated data fields, where the order and type of linking between the fields are user selected. A different aspect is a computer system, such as a computer host or other appropriate digital processing unit, programmed to provide a graphical user interface enabling a computer user to conveniently fill-out, configure, and submit a structure of interrelated data fields, where the order and type of linking between the fields are user selected. Still another aspect of the invention is a signal-bearing medium, tangibly embodying a program of machine-readable instructions executable by a processor to enable a computer user to conveniently fill-out, configure, and submit a structure of interrelated data fields, where the order and type of linking between the fields are user selected.

The present invention provides a number of distinct advantages over the related art. For example, the present invention provides users greater efficiency, flexibility, and power in completing electronic forms containing data fields with complex interrelationships. With the invention, users are not burdened with a preconstructed, fixed-format electronic form, which may not be suitable for their intended data structure. Instead, the invention facilitates completely custom construction and completion of data structures that include interrelated data fields. As a result, users can more quickly structure electronic form data that more accurately expresses their intentions. The invention also provides various other advantages and benefits, as explained below.

DETAILED DESCRIPTION

The nature, objectives, and advantages of the invention will become more apparent to those skilled in the art after considering the following detailed description in connection with the accompanying drawings. As mentioned above, the invention concerns a method and system enabling a computer user to conveniently fill-out, configure, and submit a structure of interrelated data fields, where the order and type of linking between the fields are user selected.

HARDWARE COMPONENTS & INTERCONNECTIONS

Figure 1:
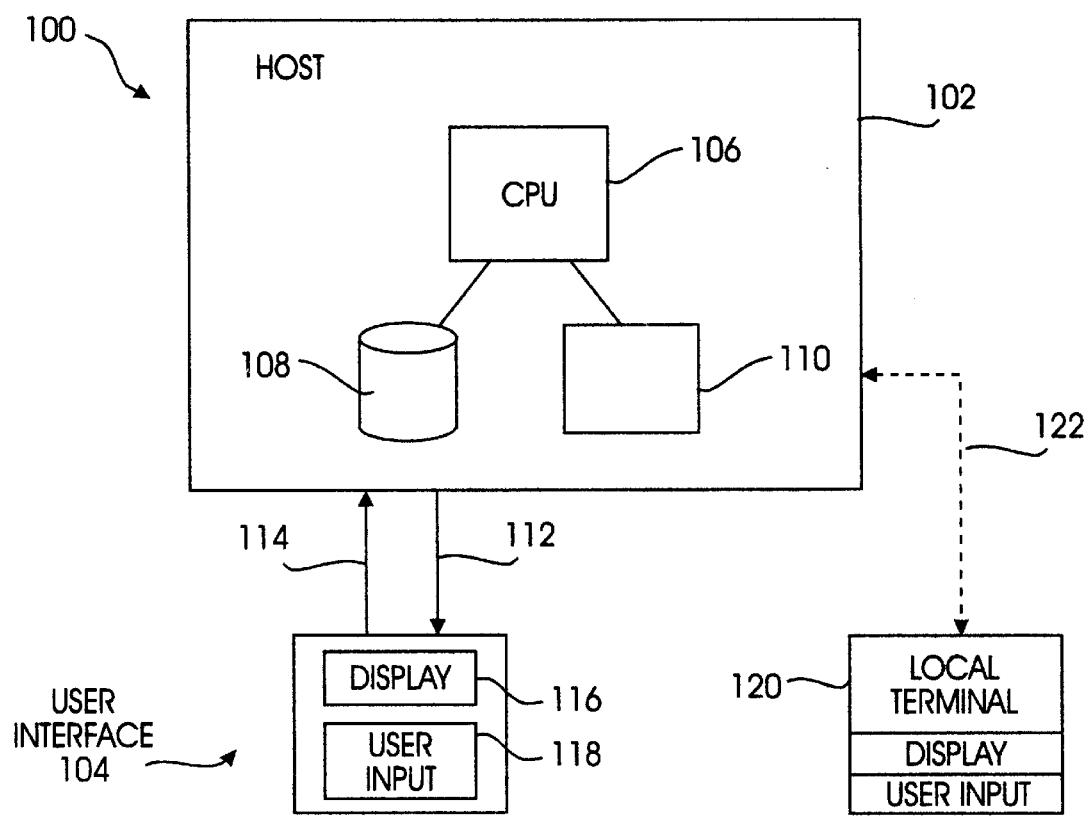
FIG. 1 depicts a diagram of the hardware components of a computer system according to one embodiment of the invention.

One aspect of the invention concerns a computer system, providing a graphical user interface (GUI). In an exemplary embodiment, this system may be implemented by a computer hardware environment as shown by the system 100 of FIG. 1.
Host Computer The system 100 includes a host computer 102, which may comprise a server, personal computer, computer workstation, supercomputer, mainframe computer, or another suitable digital data processing apparatus. For ease of description, the computer 102 is discussed as a server, such as an IBM brand AS/400 machine.

The host computer 102 includes a CPU 106 is communication with at least one digital data storage. In the illustrated example, the storage is embodied by a non-volatile disk drive storage 108 and a temporary memory 110, such as random-access-memory (RAM).
User Interface The host computer 102 is coupled to a user interface 104. Communications between the host 102 and user interface 104 are conducted by an input channel 112 and an output channel 114. The channels 112/114 may comprise wires, busses, computer backplanes, fiber optic channels, satellite or other wireless connection, telephone lines, computer networks (e.g., local or wide area networks, Internet, Intranet, etc.), or any other suitable communications links.

The user interface 104 presents data in human-readable form to the user (not shown), and receive input from the user for submittal to the host 102. To achieve these purposes, the user interface 104 may include a visual display 116 and a user input device 118, as shown. The display 116 may comprise a computer cathode ray tube (CRT) monitor, light-emitting diode array, flat-panel display, liquid crystal diode (LCD) display, projection system, or any other suitable mechanism for visually conveying data to a human user. The user input device 118 may comprise a push-button mouse, keypad, touch-sensitive computer display screen, digitizing pad, voice recognition system, foot pedal, brainwave sensing device, or any other mechanism to receive human input.
Local Terminal In one embodiment, the invention may be implemented directly by the host 102 and user interface 104, without participation by any other processors. In this embodiment, the host 102 executes machine-readable code to provide the GUI of the invention (described below); this involves presenting text and/or graphics at the display 116, and receiving human input via the user input device 118.

A different arrangement is possible where the host 102 operates with an (optional) independent processing device such as the local terminal 120. The terminal 120 is coupled to the computer 102 by a communications link 122, such as fiber optics, satellite link, cables or wires, intelligent computer channel, telephone lines, the Internet, an intranet, a local or wide area network, or any suitable digital communications medium. The terminal 120 includes one or more user interfaces, such as a visual display and user input device as illustrated. In the local terminal embodiment, the host 102 transmits machine-executable code to the terminal 120, which is executed at the terminal 120 to provide the improved electronic form GUI of the invention at the local computer's user interface. Using input obtained with the GUI, the terminal 120 may "submit" the data by storing it locally and/or transmitting the data to the host 102.

OPERATION

In addition to the various hardware embodiments described above, a different aspect of the invention concerns a method for providing a GUI enabling a computer user to conveniently fill-out, configure, and submit a structure of interrelated data fields, where the order and type of linking between the fields are user selected.
Signal-Bearing Media In the context of FIG. 1, such a method may be implemented, for example, by operating the CPU 106 (and optionally the local terminal 120) to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to enable a computer user to conveniently fill-out, configure, and submit a structure of interrelated data fields, where the order and type of linking between the fields are user selected.

Figure 8:
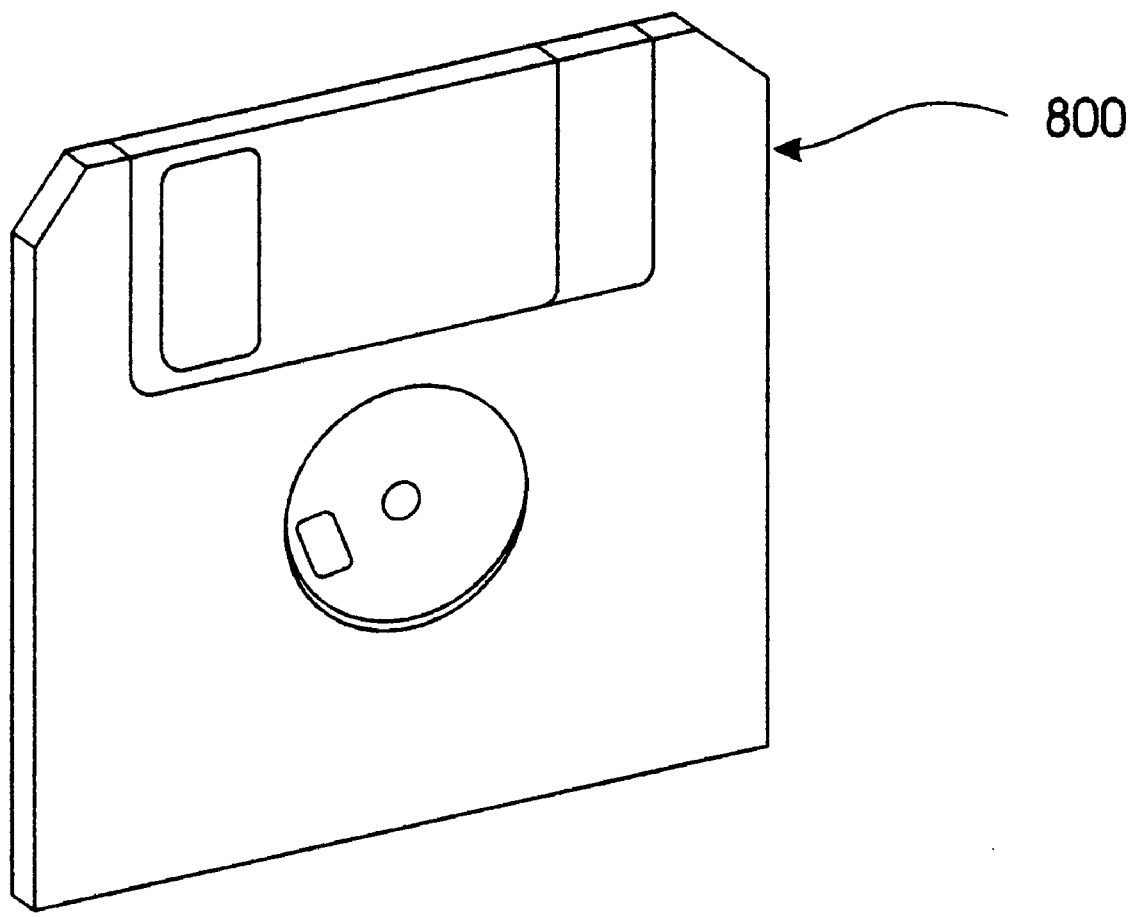
FIG. 8 depicts an illustrative signal-bearing medium according to the invention.

This signal-bearing media may comprise, for example, RAM (not shown) contained in the host 102, as represented by the storage 110. Alternatively, the instructions may be contained in another signal-bearing media, such as a magnetic data storage diskette 800 (FIG. 8), directly or indirectly accessible by the CPU 106. Whether contained in the host 102, diskette 800, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from virtually any programming language, such as JAVA, PERL, JAVA Applet, JAVA script, Active Server Program ("ASP"), and Pro Script, etc.

Overall Sequence of Operation

Introduction

Figure 2:
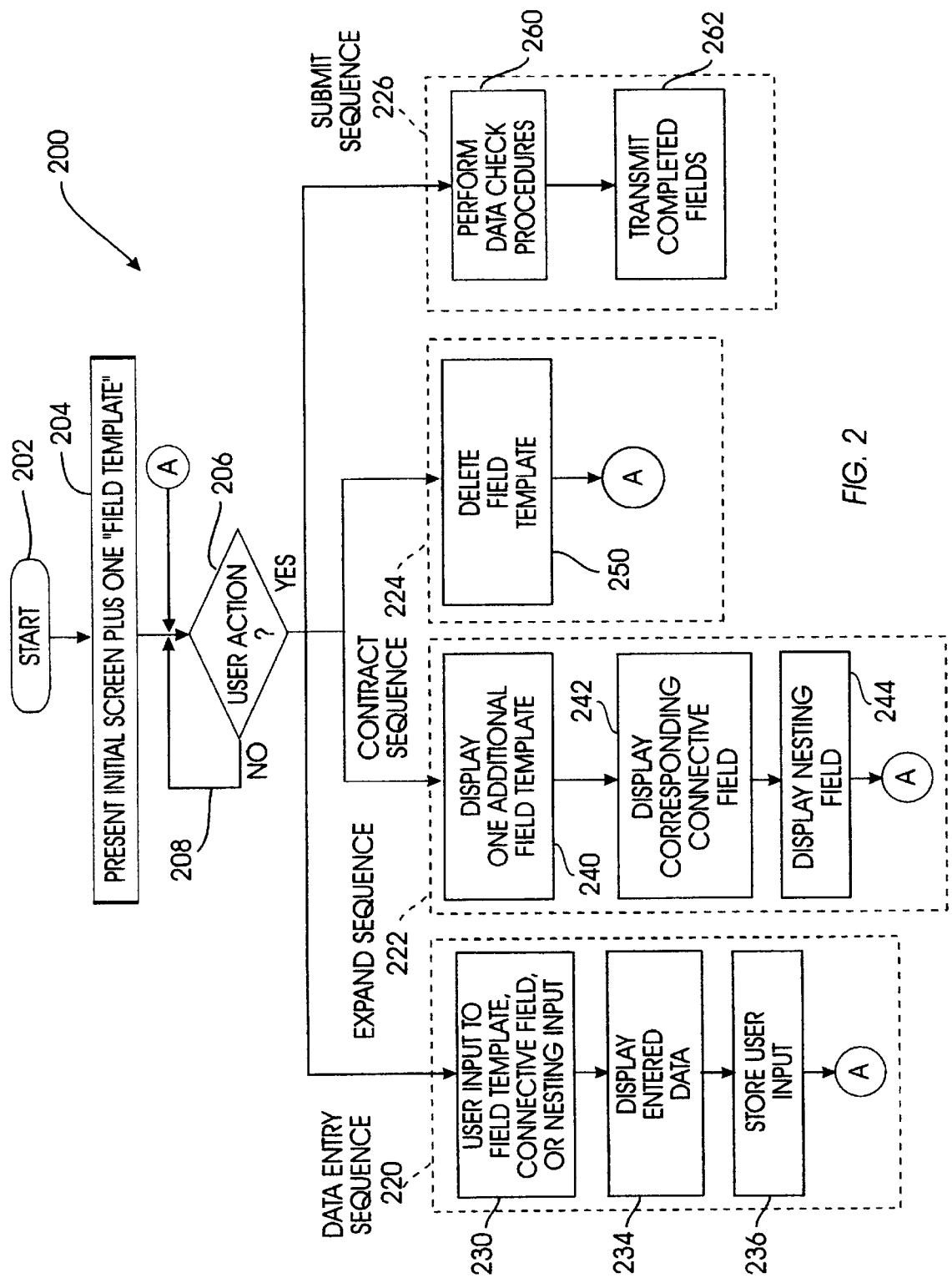
FIG. 2 depicts a flowchart illustrating a method sequence according to the invention, enabling a computer user to conveniently fill-out, configure, and submit a structure of interrelated data fields, where the order and type of linking between the fields are user selected.

FIG. 2 shows a sequence 200 to illustrate one example of the method aspect of the present invention. For ease of explanation, but without any limitation intended thereby, the example of FIG. 2 is described in the context of the hardware environment provided by the system 100 (FIG. 1), as described above.

In one embodiment, the host 102 transmits machine-executable code to the terminal 120, and the terminal 120 locally executes the code to perform the sequence 200. As an example of this embodiment, the terminal 120 and host 102 may be coupled via Internet link (122), where the user operates the terminal 120 to visit a worldwide web site ("web" or "WWW") site provided by the host 102. While interacting with the host's web site via the terminal 120, the user opts to complete an electronic form; this option is communicated to the host 102 by the user's menu selection, hyperlink, mouse-clicking an icon, etc. In response, the host 102 transmits the machine-executable code to the terminal 120 for local execution. The machine-executable code may comprise source code, executable binary code, JAVA Applet, ACTIVE-X program, or another format suitable to the application. Then, the terminal 102 locally executes the received code to provide a GUI for enabling the user to conveniently fill-out, configure, and submit a structure of interrelated data fields, where the order and type of linking between the fields is user selected.

In another embodiment, the sequence 200 may be performed directly by the host computer 102, which accepts, processes, and responds to user input from the interface 104 (or terminal 120). In this embodiment, the sequence 200 comprises an application program running on the host 102, which directly obtains information from the user without requiring locally executed code. For ease of explanation, without any limitation intended, the following description is discussed in the context of this embodiment. One example of this embodiment arises where the host 102 comprises the user's personal computer, running an application program that gathers data with a computerized form GUI.

Initial Screen

After the sequence 200 begins in step 202, step 204 presents an initial screen upon the display 116. The initial screen includes one "field template." A field template is a graphical construct with one or more data fields, which may be completed by user entry of data.

To illustrate a specific example, each field template may include two data fields, including a "classification" field and a "data-entry field." When completed by the user, the data-entry field contains information, and the classification field specifies a class that categorizes the information of data-entry field. As will be apparent to ordinarily skilled artisans, the classification and data-entry fields may be completed by a number of various techniques such as manual text entry, pull-down menus, scrollable menus, graphical "radio buttons" selected by a mouse-clicking in a circular area next to an explanatory legend, "checkable" lists where legend entries are listed next to mouse-clickable boxes that are darkened or "x-ed" when selected, etc. In the example illustrated below, the classification field is pre-programmed with a number of classification entries, chosen by the user from the classification field by activating a pull-down menu accessible with the user input device 118. For instance, if the form being completed is a patent database search query, some exemplary classification entries might be: "description," "title," "inventor," "assignee," "licensee," "year," and a generic category for data not belonging in the listed classification entries.

Continuing with this example, the data-entry field is associated with the classification field, and may be initially presented blank and ready to receive input from the user. However, the data-entry field may be pre-programmed with standard, common, or expected input data. Input from the user may be received by the user typing the appropriate information on a keyboard, for example. However, other selection mechanisms may be used in stead, such as pull-down menus, graphical "radio buttons," checked "boxes," etc.

In addition to the field template, the initial screen includes a "submit field" and an "expand field," as discussed in greater detail below. Responsive to user activation of the expand field, the GUI adds another field template to the display 116. Responsive to user activation of the submit field, the GUI transmits a representation of the completed form to a destination such as another computer or storage.

Each field template may also be displayed with a "contract" field associated with that field. Responsive to user selection of a contract field, the GUI removes the associated field template from the display.

Although the example of an database search query is used herein, the present invention may be used with any number of applications, such as Internet search engines, software registration forms, spreadsheets, or any other application requiring user construction and submittal of a complex data structure of interrelated data fields.

User Action

Step 206 monitors the user interface 116 for any action by the user, as detected by the user input device 118. If no user action is detected, control returns to step 206 via a path 208. In the illustrated example, as explained more thoroughly below, "user action" occurs when the user provides data as input to a field template, chooses to expand a field template, chooses to contract a field template, or submits the contents of the electronic form.

Upon detecting user action, step 206 advances to an appropriate one of the following sequences: a data entry sequence 220, an expand sequence 222, a contract sequence 224, or a submit sequence 226.

Expand Sequence

Step 206 initiates the expand sequence 222 whenever step 206 detects user action involving selection of an expand form option. In the illustrated example, the user chooses the expand form option by mouse clicking on a graphical "expand" field. As a different approach, the user may instead press an "expand" key or key combination on a keyboard, or another suitable selection technique. In response to selection of the expand form option, the host 102 causes the display 116 to add an additional field template in step 240, thereby expanding the electronic form. In one embodiment, the added field template may be blank; alternatively, some of the new field template's contents may be pre-completed based upon user preferences, past selections, current conditions, standard selections, or other factors. The new field template includes one or more data fields, such as the classification and data-entry fields of the presently illustrated example.

In addition to the field template of step 240, step 242 displays a "connective" field, which comprises a user-configurable link between the new and previous field templates. The connective field displayed with the added field template serves to logically link the new field template with the previous template. In one example, the connective field may be pre-programmed with a number of different logical connectors, such as the Boolean AND, OR, AND NOT, NOR, XOR, etc. Another connective field connector comprises APPEND, designating the added field template as an add-on to the previous field template; this may be used, for example, to continue a lengthy data entry. The connective field may be implemented by pull-down menu, graphical icons, manual entry, graphical "radio buttons," checking "boxes," or another one or many known graphical and data entry techniques. In the present example, each connective field is implemented by a different pull-down menu.

In addition to the field template of step 240, and the connective field of step 242, step 244 displays a "nesting" field. The nesting field receives user input concerning the hierarchical interrelationship of field templates, also called logical "nesting." The nesting field may be implemented by pull-down menu, graphical icons, manual entry, graphical "radio buttons," checking "boxes," or another one or many known graphical and data entry techniques. In the present example, each nesting field is implemented by a graphics icon.

In one embodiment, the expand sequence may also reposition the submit and expand fields to a convenient position, such as below the last-added field template. Alternatively, the submit and expand fields may be displayed at a fixed location, regardless of the addition or removal of a field template from the display.

After the second field template, corresponding connective field, and nesting field are added, the sequence 222 returns to step 206 to wait for further instruction from the user.

Contract Sequence

If step 206 detects user action involving selection of the contract field, the program advances to the contract sequence 224. In the present example, the user selects the contract field by mouse clicking on the graphical "contract" field. In a different example, a keyboard key or key combination may be used, or another suitable approach.

As shown in step 250, the contract sequence 224 is implemented by deleting display of the field template associated with the selected contract field. Namely, once the "contract" field is selected, the host 102 removes the associated field template from the display 116. In addition, any stored data represented in the deleted field template may be deleted from storage. After step 250, the sequence 224 returns to step 206.

Data Entry Sequence

Step 206 initiates the data entry sequence 220 whenever the detected user action involves user entry to a classification field, data-entry field, connective field, or nesting field. In step 230, the user accesses the user input device 118 to provide input to the host 102. In the present example, user input includes one or more user entries to the classification field, data-entry field, connective field, and/or nesting field.

In the present example, the classification field is completed by the user operating a pull-down menu containing a predetermined list of classification entries. In this example, the data-entry field is completed by the user's entry of text using a keyboard. To complete the connective field, the user may operate a different pull-down menu. As one example, the user may complete the nesting field by mouse clicking on a representative icon or by pressing a key (such as the "TAB" key) for each level of desired logical nesting. For example, whenever the nesting field is selected, the host 102 responds by indenting the associated field template to visually identify that the particular field template is of a logically lower level than the prior field template. The nesting is a visual method of identifying logical groupings within a Boolean term that would typically be accomplished using parenthesis. This allows the user to create sophisticated search terms by indenting the appropriate field templates.

In step 234, the host 102 exhibits the completed fields upon the display 116. Step 234 may occur concurrently with step 230. In step 236, the host 102 temporarily stores the data graphically represented in the field template(s) shown on the display 116. Step 236 may occur together with one or both of steps 230 and 234. Storage of the field template may be accomplished by storing the entire form including the classification fields and data fields, or the user's entries alone may be stored. Furthermore, the user's entries may be stored in a variety of data structures, such as a relational database, linked list, ASCII text, graphics image, table, etc. Storage may be directed to disk drive storage, RAM, an external device, or any suitable site.

After step 236, the data entry sequence 220 ends, and control returns so step 206.

Paths may be Invoked in Any Order

The data entry sequence 220, expand sequence 222, and contract sequence 224 may be executed any number of times, depending on the amount of information the user needs to input into the form. For example, if the user wishes to enter a database search query that includes five search terms, the user may incorporate five field templates into the form by pressing the expand key four times, and then proceed to fill out each field template.

Furthermore, the particular order of invoking the sequences described above is merely exemplary, and may occur in different order. For example, the user may opt to expand the form to include several field templates prior to completing any classification fields, or entering any data into the corresponding data-entry fields. Additionally, the user may expand the form to include a number of field templates, select a classification entry for each of the field templates, and then complete the data fields. Also, the user may contract the form by eliminating a single field template at any time during the selection of classification entries or the entering of data. Many other operational sequences are further possible, as recognized by those of ordinary skill in the art having the benefit of disclosure.

Submit Sequence

If step 206 detected user selection of the submit field, the submit sequence 226 is performed. The submit sequence 226 includes an optional step 260 to provide several functions, including the application of data checking procedures to the completed form. As an example step 260 may ensure that the data in each of the data-entry fields corresponds to the selected classification field. In this example, these data checking procedures may verify that a data entry corresponding to a "year" classification field includes two or more numbers. If there is any data within a data field that does not conform to such data checking procedures, the user may be prompted to make corrections. Additionally, the completion of any mandatory fields may be verified during step 260. Mandatory fields, for example, may include fields that must be completed regardless of the length or content of the completed form.

After the data fields pass the verification step 260, step 262 transmits a representation of the completed form to a predefined destination. This representation signifies contents of the classification fields, data-entry fields, connective fields, and a representation of nesting, and may comprise any suitable data structure, such as a linked list, database, ASCII text, table, or even the form contents as graphically represented on the display.

In the case of the user interface 104, transmission is directed at the host computer 102 via the channel 114. With the local terminal 120, transmission may be directed at the host computer 102 and/or storage local to the terminal 120. For instance, if the link 122 comprises an Internet connection to a worldwide web site running on the computer 102, the transmission of step 262 may involve the terminal 120 returning data back to the computer 102. Alternatively, the terminal 120 may submit forms by storing them on storage (e.g., hard drive) at the terminal 120; this may be useful for more personal applications such as personal expense accounting.

Detailed Operation

The operation of the present invention will be more fully discussed in terms of the completion of an database query, which will serve as the example throughout the remainder of this disclosure. A database query is particularly useful because such known database queries are frequently complicated and require a complex description. Also, the user may not be sure of some aspects of the search database and would like to search by using a number of classification terms. In this situation, the user would benefit from having a flexible form that has enough expressive power to communicate the necessary information, while still maintaining the structure of the information thereby allowing for its effective processing by the underlying application.

The process of providing a GUI enabling the user to create extendible structured fields on electronic forms, as mentioned above, is described in greater detail below by combining exemplary displays of FIGS. 3–7 with the sequence 200 of FIG. 2.

Initialization with Single Field Template

Figure 3:
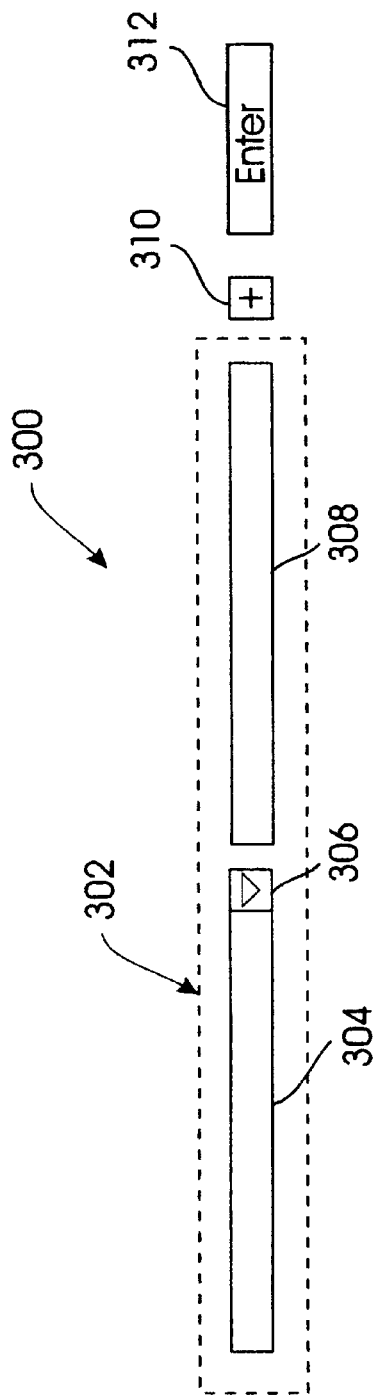
FIG. 3 depicts a single field template showing a completed classification field according to the invention.

Referring now to FIG. 3, an initial screen is shown and generally designated 300. The screen 300, created in step 204, includes a field template 302 having a classification field 304, a classification field expand key 306, and a data-entry field 308. Additionally, the display 300 includes a form expand key 310, and an enter key 312.

In a preferred embodiment, the GUI may display classification entries by order of priority, alphabetically, or in their order of likelihood of occurrence, etc. Additionally, the GUI may list categories of information to be entered, as well as attributes of the information and keywords related to the classification field. Such listings may be implemented by presenting a list of information categories within a pull-down menu accessible by the user, or within a scrolling list.

User Action

Figure 4:
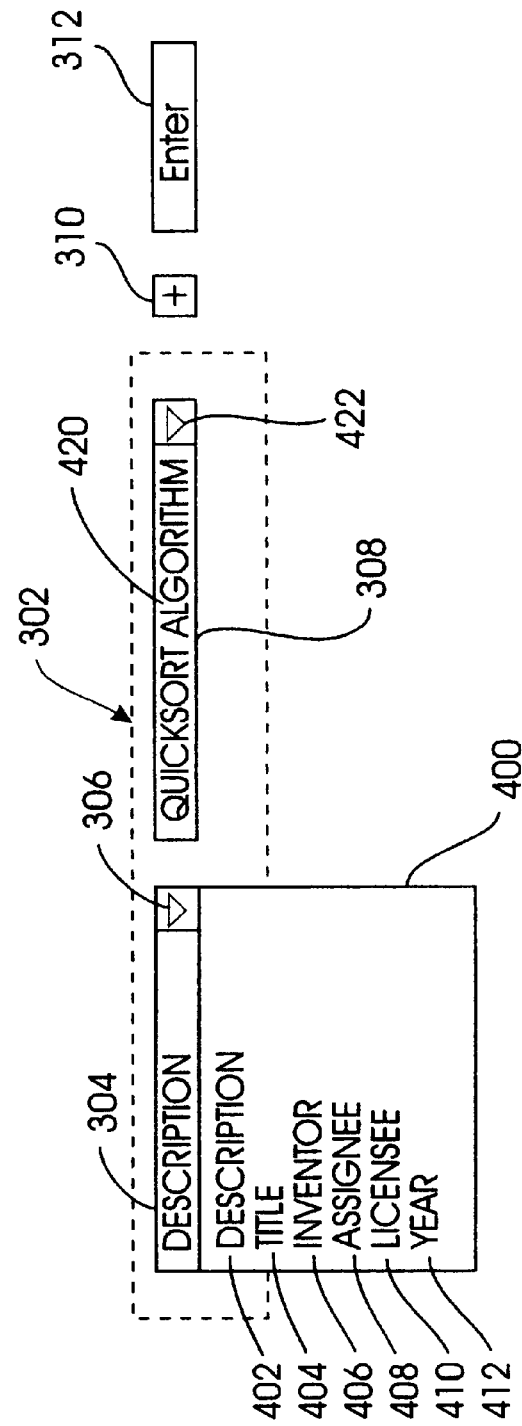
FIG. 4 depicts the field template shown in FIG. 3, having a pull-down selection to complete the classification field, and a completed data field according to the invention.

Referring now to FIG. 4, if the user selects the field expand key 306 in step 206, the host computer 102 presents a pull-down classification table 400 that includes a number of pre-programmed classification entries. For instance, the classification table 400 includes the following classification entries: "description" 402; "title" 404; "inventor" 406; "assignee" 408; "licensee" 410; and "year" 412. The classification entries shown within the classification table 400 are merely exemplary, and that any variety of classification entries may be placed within the classification table.

The classification table has been shown as a single column, however, two-column or other formats are also contemplated. While functionally similar to the single-column classification table, a two-column classification table provides for a higher density presentation of classification entries, which would be particularly useful in implementations having limited display areas. Any other method of presenting classification field entries is fully contemplated herein. Such alternative methods, for example, include a listing of all classification selections available, with each entry being equipped with a "radio button" or check-box for identification of a particular classification entry.

When the user selects the field expand key 306, the data entry sequence 220 is invoked, and a classification entry from the classification table 400 may be selected and displayed in steps 230, 234. In the illustrated example, the "description" classification entry 402 is chosen by user operation of the user input device 118. Selection of the description entry 402 causes step 234 to display the selected classification entry in classification field 304, thus completing the classification field 304.

Data Entry

Also in step 230, the user may enter data into the data-entry field, as shown in FIG. 4. For example, the data-entry field 308 is completed with the text entry "quicksort algorithm" 420, such that the field template 302 is now completed showing a "description" 420 of "quicksort algorithm" 420. Entering of any necessary data is accomplished using a keyboard, or other implementation of the input device.

Where there has been a history of database querying with a particular classification field entry, the data-entry field associated with the classification field may be automatically completed with the most recent entry. For instance, if the user completing the database query has previously selected a "description" classification, and at that time had entered a data-entry field value, the present invention may automatically enter the previously entered data-entry field value in an attempt to minimize the time required to complete the form. Alternatively, the present invention may provide a listing of previously-entered data-entry field values, thus allowing the user to select the appropriate data entry, or simply enter a new data-entry field value. For example, this may be accomplished by providing a data entry display button 422, which when activated by the user, provides a table listing of the previously entered data entries, and a user may select one of the data entries presented. In the event the pre-entered data-entry field information is not correct, the user may modify or overwrite such entry with the corrected information using the user interface. The data entry sequence 220 may also be invoked to change data that the user previously entered in a complete field template. In other words, the user may edit data of the data-entry field, classification field, etc.

Once the information has been entered and displayed in steps 230 and 234, the information is stored in step 236.

Expansion

A second field template may be added by selecting the expand key 310, thereby adding field template 500 (FIG. 5) in step 240 of the expand sequence 222. The field template 500 is similar to the field template 302, and includes a classification field 502 having a classification expand key 504, and a data-entry field 506.

Figure 6:
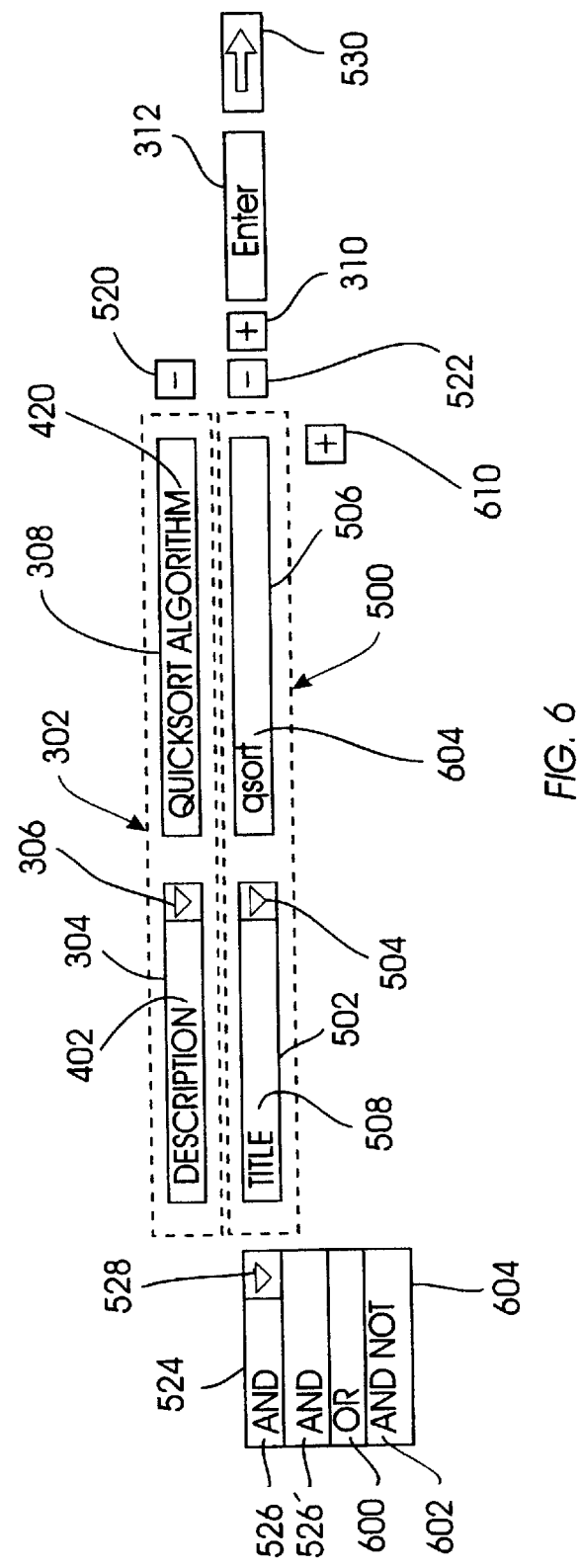
FIG. 6 depicts the field templates shown in FIG. 5, with the connective field having a selection of Boolean terms according to the invention.

With the addition of the field template 500, the host computer 102 presents a contract button 520 corresponding to field template 302, and a contract button 522 corresponding to the field template 500. Also, with the addition of the field template 500, the host 102 presents a connective field 524 to fix the relationship between the newly added field template and the immediately preceding field templates. For instance, the field templates 302 and 500 are related by the connective field 524, which exhibits the Boolean operand AND 526. Thus, as explained further below, FIG. 6 represents a database query of (description=quicksort algorithm) AND (title=qsort).

In addition to adding field templates, the illustrated embodiment permits the user to add extra data-entry fields in association with a single classification field. For example, if a user has more than one data entry for a single classification field entry, the field template may be extended to include one or more additional data-entry fields. This may be accomplished by providing a data-entry field expand key 610 (FIG. 6) associated with a data-entry field which, upon selection by the user, provides an additional data-entry field (not shown). In this manner, it is not necessary to have more than one occurrence of a particular classification field in any form, as repeating classification entries may be replaced by a single classification field with multiple data entries.

If multiple data-entry fields are associated with a single classification field, one embodiment of the invention permits the user to determine the logical relationship between the various data-entry field entries. For example, in the present example of a database query, the user may determine whether the multiple data-entry field entries are logically combined with AND, OR, etc. This determination may be accomplished by the user activating the user interface to select a special connective field (not shown) associated with the multiple data-entry fields. Alternatively, each additional data-entry field may be associated with its own connective field (not shown) enabling the user to create a search query with a single classification field and multiple data-entry fields. For example, a field template may include a classification entry of "description" and two data fields having "quicksort algorithm" and "mergesort." Using a Boolean connective OR, this field template would combine into the Boolean expression "description=(quicksort algorithm OR mergesort)."

After the field template 500 has been added in the expand form sequence 222, the sequence 222 ends and returns to step 206.

Advanced Data Entry

Having expanded the electronic form as shown in FIG. 6, the user may select the classification expand key 504 to display the classification table 400 (FIG. 4). The classification table for the field template 500 may be modified to account for classification entries previously selected. For instance, since the classification entry selected in field template 302 was "description" 402, it may be efficient to remove the "description" classification entry from the classification table, or to otherwise visually distinguish previously selected classification entries from other classification entries within the classification table, such as by highlighting, or using color. This is particularly beneficial where it is not possible to have more than one entry in a form having the same classification field, such as in a database search where the title of a work is being searched.

Figure 7:
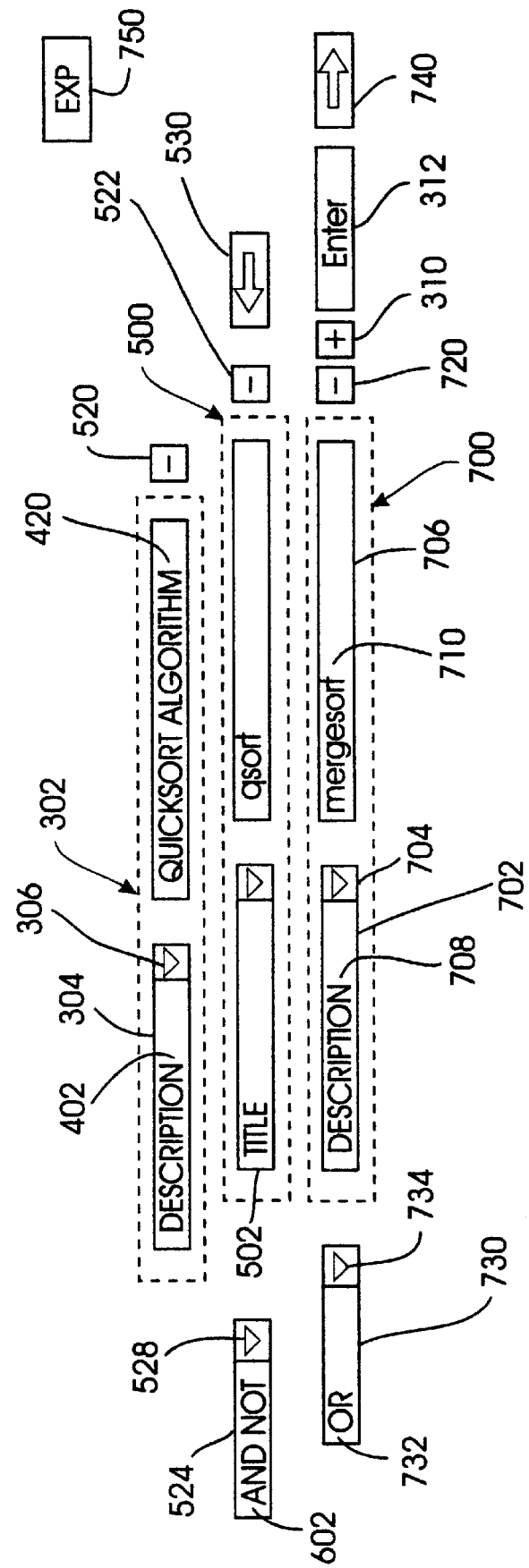
FIG. 7 depicts the field templates of FIG. 6 with a third field template and associated connective field, with the second and third field templates exhibiting relative nesting according to the invention.

FIG. 6 shows the user selection of "title" classification entry 404, which is shown entered in classification field 502. Completion of the classification entry occurs in step 230 of the data entry sequence 220. Likewise in step 230, the user inputs data into data-entry field 506, such as the title of the sorting algorithm. In this case, the user has entered "qsort" 604 in the data field 506.

Where the user is unfamiliar the available classification entries, one embodiment of the invention permits the user to select all of the entries within the classification table 400 simultaneously. This may be accomplished by operating the user interface to highlight all the classification entries at the same time. In response, the host computer displays a classification field for each classification table entry, allowing the user to enter all information within the form without having to individually specify all classification fields. This is particularly useful in situations where the user expects to complete substantially all classes; the user may delete those few classification fields which are not used using the contract sequence 224. In another embodiment, field templates for all possible classification entries may be concurrently displayed in response to user selection of an expand form button 750 (FIG. 7). The button 750 may serve to toggle between a fully-shown form and a shortened form containing completed field templates only.

Connective Fields

FIG. 6 shows the connective field 524 having a connective term "AND" 526. The connective field 524 is equipped with a connective field table 604 which may be pre-programmed with one or more connective terms. In the instant example, the connective field table 604 is displayed in response to selection of connective expand key 528, and includes connective term "AND" 526, "OR" 600, and "AND NOT" 602. The connective table 604, however, may include a variety of connective terms, in addition to traditional Boolean operands. For instance, instead of the search query discussed in conjunction with FIG. 5 which was (description=quicksort algorithm) AND (class name=qsort), a connective "WITHIN 30" (not shown) may be used. With this substitution, the new search query is (description=quicksort algorithm) WITHIN 30 (class name=qsort), and identifies all occurrences within the database where the term "quicksort algorithm" is within 30 entries of the term "qsort." This type of connective is particularly useful where the user is looking for information within a database which is closely positioned. In any case, any variety of operands may be used in the present invention, and are consequently fully contemplated herein.

Nesting of Field Templates

Referring now to FIG. 7, a third field template 700 has been added, and includes a classification field 702 having a classification expand key 704 and a data field 706. In the manner discussed above, classification field has been completed with classification entry "description" 708, and data-entry field 706 has been completed with "mergesort" 710. Also, a connective field 730 has been added and completed with connective "OR" 732, selected from a connective table (not shown) displayed by selecting the connective expand key 734.

Figure 5:
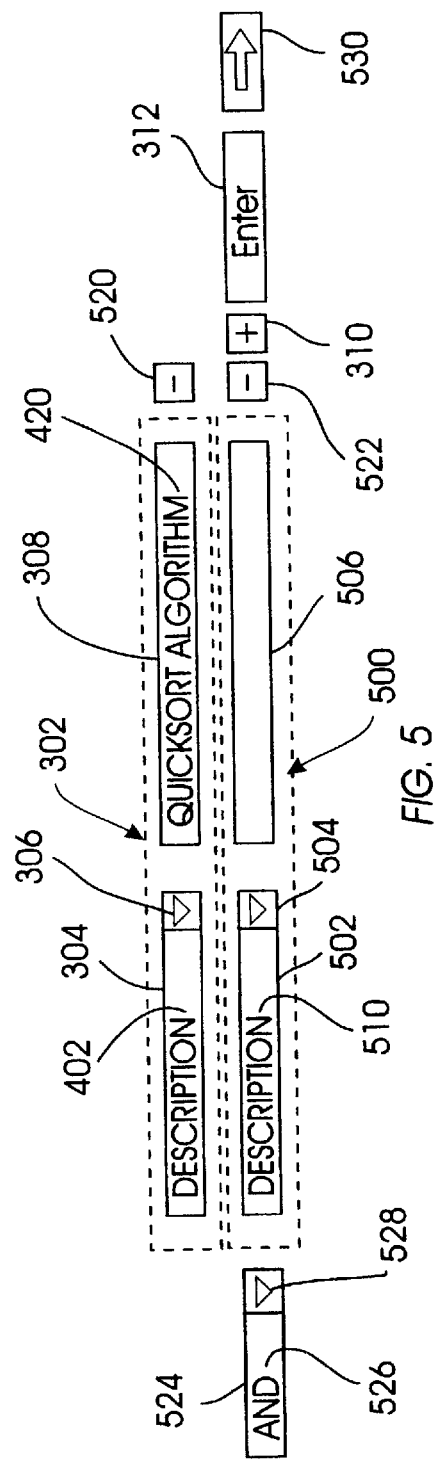
FIG. 5 depicts the field template shown in FIG. 3 with an added field template, a connective field, and a nesting field according to the invention.

The completed field template 500 in FIG. 7 appears to the right of its initial position shown in FIGS. 5–6, and this reflects a nesting of the field templates in a hierarchical fashion. This is accomplished by user selection of the nesting key 530 which visually shifts the associated field template to the right on display 300. Logically, a nesting of a field template creates a parenthetical search term which includes all subsequently entered field templates, until the nesting is reversed. For example, the field template 500 has been nested beneath field template 302. Consequently, all subsequent field templates may also be nested to the same level as field template 500.

As a result of the nesting of field template 500, the search query created by the field templates shown in FIG. 7 is as follows: field template 302 is combined in an AND NOT operation with field templates 500 and 700, which are together combined in an OR operation. Thus, the resultant Boolean operation shown in FIG. 7 is "(field template 302) AND NOT (field template 500 OR field template 700)." Taking into account the field template contents shown, the search term created by the display in FIG. 7 is "(description= quicksort algorithm) AND NOT ((class name=qsort) OR (description=mergesort)).

The nesting of the field templates may be accomplished by user selection of the nesting key 530. The nesting key 530 enables the user to create a logically complex entry by identifying the field templates to be nested. In order to allow the user to modify the nesting of a series of field templates, the nesting key 530 may change directions once selected. Such a direction change can be seen by comparing the direction of the nesting key 530 between FIG. 6 and FIG. 7. Thus, once the user has opted to nest field template 500 by pressing the nesting key 530, the user may just as easily undo the nesting by again selecting the nesting key 530.

Further nesting may be accomplished by the user selection of the nesting key 740. Selection of the nesting key 740 serves to nest the field template 700 under the field template 500, wherein any subsequently entered field templates would be logically combined with the field template 700. For example, if the user selects the nesting key 740, and adds a fourth field template (not shown) with the classification and data fields of (assignee=IBM) and a connective of AND, then the resultant search query is "(description=quicksort algorithm) AND NOT (((class name=qsort) OR ((description=mergesort) AND (assignee=IBM)))."

A user may change the nesting of the field templates on an electronic form at any time. Thus, although the nesting has been principally discussed in conjunction with FIG. 7, it is to be appreciated that field template 500 may have been nested under field template 302 immediately upon expansion of the form. Following user selection of a nesting key 530, each subsequently entered field template may be similarly nested. Alternatively, the nesting may terminate with each field template, thus inserting each new field template at the original non-nested level. In any case, the present invention provides a user with the ability to simply and easily create a complex and structured entry to an electronic form.

Contraction

When a form has been expanded to include more than one field template, a contract key, such as keys 520, 522, and 720 are displayed enabling the user to delete the associated field template. For example, if following the creation of field template 500 in FIG. 5, the user wishes to delete field template 302, the user may select the contract key 520 in step 206 thereby initiating the contract sequence 224. In the contract sequence 224, the host 102 removes the field template 302 from the form in step 250. Alternatively, if the user wishes to delete the field template 500, the user may select the contract key 522. Prior to the deletion of the field template, the present invention may prompt the user to verify intent to delete that particular field template, and provide an escape if such deletion is not intended.

Submission

Following completion of the data-entering process into the classification fields and data-entry fields, the user may chose to submit the completed form. This occurs in the submit form sequence 226. For example, referring briefly to FIG. 1, submission of the entire completed form, or only the classification entries and corresponding data entries, may include the transmission of the information from the local terminal 120 to the host 102. Alternatively, submission of the entire completed form, or only the classification entries and corresponding data entries, may include a transmission between programs operating within the same computer 102. Submission may be achieved by the user pressing the "enter" keyboard button 312 which invokes the verification steps outlined above. These verification steps may include verification that sufficient classification fields and data fields are completed in order to represent a completed form. Additionally, the verification step may also include steps to insure that mandatory classification and data fields have been completed, such as the users name, address, date of submission, and the like.

If all verification steps are completed and the completed form is in appropriate condition for submission, the form is then submitted to the program or device intended to receive the form. For instance, in the database query example, the intended program may be the IBM patent database, which receives the completed form, identifies any patents that satisfy the criterion set forth in the field templates, and returns a listing of those patents to the user. As an alternative to transmission of the entire form, only the user-entered data may be transmitted to the intended program to minimize the length of the transmission and the amount of information to be transmitted.

OTHER EMBODIMENTS

While there have been shown what are presently considered to be preferred embodiments of the invention, it will be apparent to those skilled in the art that various changes and modifications can be made herein without departing from the scope and spirit of the invention as defined by the appended claims and their equivalents. Furthermore, although elements of the invention may be described or claimed in the singular, the plural is contemplated unless limitation to the singular is explicitly stated.

What is claimed is:

1. A computer-driven method of providing a user interface to gather data, the method comprising:

transmitting a program of machine-readable instructions from a host computer to a local computer;

the local computer receiving and executing the instructions, the executing of the instructions directing the local computer to perform operations comprising:

displaying on a video display a field template including at least one data field;

displaying on the video display an expand field and a submit field;

receiving user entry to one or more of the data fields;

determining whether the user has selected the expand field, and for each user selection of the expand field, displaying on the video display an additional field template and a connective field, each connective field displaying a list of predefined user-selectable Boolean terms defining relationships between the additional field template and a previous field template;

displaying a nesting field in association with each additional field template;

receiving user entry to each connective field, each entry comprising selection of one of the predefined connective terms;

determining whether user entry to the nesting fields has occurred, each entry comprising selection of a nesting level, and responsive to user entry to a particular nesting field, changing the display of the associated field template to include indentation according to the selected nesting level;

receiving user entry to one or more of the data fields of each additional field template; and determining whether user selection of the submit field has been received, and if so, transmitting a machine-readable representation of the user entries and their relationship to the host computer; and the host computer receiving the representation from the local computer.

2. A computer-driven method of providing a user interface to gather data, the method comprising:

a host computer transmitting a program of machine-readable instructions from a host computer to a local computer, the program being executable by the local computer to perform operations comprising:

displaying on a video display a field template including at least one data field;

displaying on the video display an expand field and a submit field;

receiving user entry to one or more of the data fields;

determining whether the user has selected the expand field, and for each user selection of the expand field, displaying on the video display an additional field template and a connective field, each connective field displaying a list of predefined user-selectable Boolean terms defining relationships between the additional field template and a previous field template;

displaying a nesting field in association with each additional field template;

receiving user entry to each connective field, each entry comprising selection of one of the predefined connective terms;

determining whether user entry to the nesting fields has occurred, each entry comprising selection of a nesting level, and responsive to user entry to a particular nesting field, changing the display of the associated field template to include indentation according to the selected nesting level;

receiving user entry to one or more of the data fields of each additional field template; and determining whether user selection of the submit field has been received, and if so, transmitting a machine-readable representation of the user entries and their relationship to a predefined destination.

3. The method of claim 2, the predefined destination comprising the storage at the local computer.

4. The method of claim 2, the operations further comprising displaying one or more contract fields each associated with one field template and determining whether user selection of any contract field has occurred, and if so, deleting the associated field template from the display.

5. The method of claim 2, where the connective terms comprise Boolean connectors.

6. The method of claim 2, where the indentation of each field template is proportional to the selected nesting level of the field's associated nesting field.

7. The method of claim 1, where the nesting field comprises an icon and the determining of whether user entry to any nesting field has occurred comprises detecting user input selecting the nesting icon.

8. The method of claim 2, where the data fields of each field template comprise:

a data-entry field; and a classification field associated with the data-entry field, the classification field displaying a list of predefined user-selectable classification entries to categorize contents of the data-entry field.

9. The method of claim 2, the predefined destination comprising the host computer.

10. The method of claim 2, predefined destination comprising the host computer, the method further including the host computer receiving the representation from the local computer.

11. A computer-driven method of providing a user interface to gather data, the method comprising:

displaying on a video display a field template including at least one data field;

displaying on the video display an expand field and a submit field;

receiving user entry to one or more of the data fields;

determining whether the user has selected the expand field, and for each user selection of the expand field, displaying on the video display an additional field template and a connective field, each connective field displaying a list of predefined user-selectable Boolean terms defining relationships between the additional field template and a previous field template;

displaying a nesting field in association with each additional field template;

receiving user entry to each connective field, each entry comprising selection of one of the predefined connective terms;

determining whether user entry to the nesting fields has occurred, each entry comprising selection of a nesting level, and responsive to user entry to a particular nesting field, changing the display of the associated field template to include indentation according to the selected nesting level; receiving user entry to one or more of the data fields of each additional field template; and determining whether user selection of the submit field has been received, and if so, performing a predetermined action.

12. The method of claim 11, the predetermined action comprising storing a data structure representing the user entries and relationship between the user entries.

13. The method of claim 11, the method further comprising displaying one or more contract fields each associated with one field template, and determining whether user selection of any contract field has occurred, and if so, deleting the associated field template from the display.

14. The method of claim 11, where the connective terms comprise Boolean connectors.

15. The method of claim 11, where the indentation of each field template is proportional to the selected nesting level of the field's associated nesting field.

16. The method of claim 11, where the nesting field comprises an icon and the determining of whether user entry to any nesting field has occurred comprises detecting user input selecting the nesting icon.

17. The method of claim 11, where the data fields of each field template comprise:

a data-entry field; and a classification field associated with the data-entry field, the classification field displaying a list of predefined user-selectable classification entries to categorize contents of the data-entry field.

18. A signal-bearing medium tangibly embodying a program of machine-readable instructions executable by a digital processing apparatus to perform a method of providing a user interface to gather data, the method comprising:

a host computer transmitting a program of machine-readable instructions to a local computer, the program being executable by the local computer to perform operations comprising:

displaying on a video display a field template including at least one data field;

displaying on the video display an expand field and a submit field;

receiving user entry to one or more of the data fields;

determining whether the user has selected the expand field, and for each user selection of the expand field, displaying on the video display an additional field template and a connective field, each connective field displaying a list of predefined user-selectable Boolean terms defining relationships between the additional field template and a previous field template;

displaying a nesting field in association with each additional field template;

receiving user entry to each connective field, each entry comprising selection of one of the predefined connective terms;

determining whether user entry to the nesting fields has occurred, each entry comprising selection of a nesting level, and responsive to user entry to a particular nesting field, changing the display of the associated field template to include indentation according to the selected nesting level;

receiving user entry to one or more of the data fields of each additional field template; and determining whether user selection of the submit field has been received, and if so, transmitting a machine-readable representation of the user entries and their relationship to a predefined destination.

19. The medium of claim 18, the predefined destination comprising storage at the local computer.

20. The medium of claim 18, the operations further comprising displaying one or more contract fields each associated with one field template, and determining whether user selection of any contract field has occurred, and if so, deleting the associated field template from the display.

21. The medium of claim 18, where the connective terms comprise Boolean connectors.

22. The medium of claim 18, where the indentation of each field template is proportional to the selected nesting level of the field's associated nesting field.

23. The medium of claim 18, where the nesting field comprises an icon and the determining of whether user entry to any nesting field has occurred comprises detecting user input selecting the nesting icon.

24. The medium of claim 18, where the data fields of each field template comprise:

a data-entry field; and a classification field associated with the data-entry field, the classification field displaying a list of predefined user-selectable classification entries to categorize contents of the data-entry field.

25. The medium of claim 18, the predefined destination comprising the host computer.

26. The medium of claim 18, predefined destination comprising the host computer, the method further including the host computer receiving the representation from the local computer.

27. A signal-bearing medium tangibly embodying a program of machine-readable instructions executable by a digital processing apparatus to perform a method of providing a user interface to gather data, the method comprising:

displaying on a video display a field template including at least one data field;

displaying on the video display an expand field and a submit field;

receiving user entry to one or more of the data fields;

determining whether the user has selected the expand field, and for each user selection of the expand field, displaying on the video display an additional field template and a connective field, each connective field displaying a list of predefined user-selectable Boolean terms defining relationships between the additional field template and a previous field template;

displaying a nesting field in association with each additional field template;

receiving user entry to each connective field, each entry comprising selection of one of the predefined connective terms;

determining whether user entry to the nesting fields has occurred, each entry comprising selection of a nesting level, and responsive to user entry to a particular nesting field, changing the display of the associated field template to include indentation according to the selected nesting level;

receiving user entry to one or more of the data fields of each additional field template; and determining whether user selection of the submit field has been received, and if so, performing a predetermined action.

28. The medium of claim 27, the predetermined action comprising storing a data structure representing the user entries and relationship between the user entries.

29. The medium of claim 27, the method further comprising displaying one or more contract fields each associated with one field template, and determining whether user selection of any contract field has occurred, and if so, deleting the associated field template from the display.

30. The medium of claim 27, where the connective terms comprise Boolean connectors.

31. The medium of claim 27, where the indentation of each field template is proportional to the selected nesting level of the field's associated nesting field.

32. The medium of claim 27, where the nesting field comprises an icon and the determining of whether user entry to any nesting field has occurred comprises detecting user input selecting the nesting icon.

33. The medium of claim 27, where the data fields of each field template comprise:

a data-entry field; and a classification field associated with the data-entry field, the classification field displaying a list of predefined user-selectable classification entries to categorize contents of the data-entry field.

34. A system for gathering structured data, comprising:

a host computer;

a local computer; and a communications link interconnecting the host computer and local computer;

where the host computer and local computer are programmed to perform a method of gathering data, the method comprising:

the host computer transmitting a program of machine-readable instructions to the local computer;

the local computer receiving and executing the instructions, the executing of the instructions directing the local computer to perform operations comprising:

displaying on a video display a field template including at least one data field;

displaying on the video display an expand field and a submit field;

receiving user entry to one or more of the data fields;

determining whether the user has selected the expand field, and for each user selection of the expand field, displaying on the video display an additional field template and a connective field, each connective field displaying a list of predefined user-selectable Boolean terms defining relationships between the additional field template and a previous field template;

displaying a nesting field in association with each additional field template;

receiving user entry to each connective field, each entry comprising selection of one of the predefined connective terms;

determining whether user entry to the nesting fields has occurred, each entry comprising selection of a nesting level, and responsive to user entry to a particular nesting field, changing the display of the associated field template to include indentation according to the selected nesting level;

receiving user entry to one or more of the data fields of each additional field template; and determining whether user selection of the submit field has been received, and if so, transmitting a machine-readable representation of the user entries and their relationship to the host computer; and the host computer receiving the representation from the local computer.

35. The system of claim 34, the communications link comprising a computer network.

36. A system for gathering structured data, comprising:

a host computer, including a digital data processing apparatus and an interface, where the digital data processing apparatus is programmed to perform a method of gathering data comprising:

transmitting a program of machine-readable instructions via the interface to a local computer, the program being executable by the local computer to perform operations comprising:

displaying on a video display a field template including at least one data field;

displaying on the video display an expand field and a submit field;

receiving user entry to one or more of the data fields;

determining whether the user has selected the expand field, and for each user selection of the expand field, displaying on the video display an additional field template and a connective field, each connective field displaying a list of predefined user-selectable Boolean terms defining relationships between the additional field template and a previous field template;

displaying a nesting field in association with each additional field template;

receiving user entry to each connective field, each entry comprising selection of one of the predefined connective terms;

determining whether user entry to the nesting fields has occurred, each entry comprising selection of a nesting level, and responsive to user entry to a particular nesting field, changing the display of the associated field template to include indentation according to the selected nesting level;

receiving user entry to one or more of the data fields of each additional field template; and determining whether user selection of the submit field has been received, and if so, transmitting a machine-readable representation of the user entries and their relationship for a predefined destination.

37. A system for gathering structured data, comprising:

a user interface, including a display device and a user input device;

a digital data processing apparatus, coupled to the user interface and programmed to perform a method of gathering data comprising:

displaying on the display device a field template including at least one data field;

displaying on the display device an expand field and a submit field;

receiving user entry to one or more of the data fields via the user input device;

determining whether the user has selected the expand field, and for each user selection of the expand field, displaying on the video display an additional field template and a connective field, each connective field displaying a list of predefined user-selectable Boolean terms defining relationships between the additional field template and a previous field template;

displaying a nesting field in association with each additional field template;

receiving user entry to each connective field via the user input device, each entry comprising selection of one of the predefined connective terms;

determining whether user entry to the nesting fields has occurred, each entry comprising selection of a nesting level, and responsive to user entry to a particular nesting field, changing the display of the associated field template to include indentation according to the selected nesting level;

receiving user entry to one or more of the data fields of each additional field template via the user input device; and determining whether user selection of the submit field has been received via the user input device, and if so, performing a predetermined action.

* * * * *